(12) United States Patent
Horwitz et al.

(10) Patent No.: US 6,282,337 B1
(45) Date of Patent: Aug. 28, 2001

(54) SYSTEM AND METHOD FOR WAVELENGTH DIVISION MULTIPLEXING AND DEMULTIPLEXING

(75) Inventors: James W. Horwitz; Ray T. Chen, both of Austin, TX (US)

(73) Assignee: Radiant Photonics, Inc., Austin, TX (US)

(*) Notice: Subject to any disclaimer, the term of this patent is extended or adjusted under 35 U.S.C. 154(b) by 0 days.

(21) Appl. No.: 09/405,472

(22) Filed: Sep. 24, 1999

(51) Int. Cl.$^7$ .................................................. G02B 6/28
(52) U.S. Cl. .............................. 385/24; 385/37; 359/130
(58) Field of Search ............................ 385/37, 24, 10; 359/130, 571, 572

(56) References Cited

U.S. PATENT DOCUMENTS

| | | | |
|---|---|---|---|
| 4,643,519 | 2/1987 | Bussard et al. | 350/96.19 |
| 4,736,360 * | 4/1988 | McMahon | 385/37 |
| 4,773,063 | 9/1988 | Hunsperger et al. | 370/3 |
| 4,813,756 | 3/1989 | Frenkel et al. | 350/96.18 |
| 4,926,412 | 5/1990 | Jannson et al. | 370/3 |
| 5,026,131 | 6/1991 | Jannson et al. | 350/3.7 |
| 5,029,967 | 7/1991 | Livezey et al. | 350/96.19 |
| 5,228,103 | 7/1993 | Chen et al. | 385/14 |
| 5,278,687 | 1/1994 | Jannson et al. | 359/125 |
| 5,402,511 | 3/1995 | Malone et al. | 385/43 |
| 5,473,710 | 12/1995 | Jaw et al. | 385/14 |
| 5,493,393 | 2/1996 | Beranek et al. | 356/328 |
| 5,555,330 | 9/1996 | Pan et al. | 385/39 |
| 5,682,255 | 10/1997 | Friesem et al. | 359/15 |
| 5,703,974 | 12/1997 | Sasaki et al. | 385/14 |
| 5,777,763 | 7/1998 | Tomlinson, III | 359/130 |
| 5,796,479 | 8/1998 | Derickson et al. | 356/326 |
| 5,917,625 | 6/1999 | Ogusu et al. | 359/130 |
| 5,970,190 | 10/1999 | Fu et al. | 385/37 |
| 5,999,672 | 12/1999 | Hunter et al. | 385/37 |
| 6,003,222 | 12/1999 | Barbarossa | 29/600 |
| 6,011,884 * | 1/2000 | Dueck et al. | 385/24 |
| 6,011,885 * | 1/2000 | Dempewolf et al. | 385/34 |
| 6,084,695 * | 7/2000 | Martin et al. | 359/131 |
| 6,108,471 * | 8/2000 | Zhang et al. | 385/37 |
| 6,137,933 * | 10/2000 | Hunter et al. | 385/37 |
| 6,188,705 * | 2/2001 | Krainak et al. | 372/32 |

OTHER PUBLICATIONS

Richardson Grating Laboratory, "Technical Note 6, Echelle Gratings", pp. 1–2, Aug. 1999.*

LtCol David Honey and Robert Leheny, "Steered Agile Beams Workshop Proceedings Book", DARPA: *Conference Material*, Mar. 24–25, 1999.

Tang et al.; "Compression–Molded Three Dimensional Tapered Optical Polymeric Waveguides for Optoelectronic Packaging"; Radiant Research, Inc. : *Article*.

Tang et al.; "Reconfigurable Electro–Optic Interconnects Using Holographic Elements"; Radiant Research, Inc.: *Article*.

U.S. Pending Patent Application Ser. No. 09/205,445: Tang, et al.; "Compression–Molded Three–Dimensional Tapered Universal Waveguide Couplers"; Radiant Research, Inc. (previously cited without Ser. No. on Information Disclosure Statement filed on Sep. 24, 1999), Dec. 4, 1998.

(List continued on next page.)

*Primary Examiner*—Cassandra Spyrou
*Assistant Examiner*—Leo Boutsikaris
(74) *Attorney, Agent, or Firm*—Baker Botts L.L.P.

(57) ABSTRACT

A system and method for wavelength division multiplexing and demultiplexing are disclosed. The disclosed system may include a fiber optic element operable to transmit a multiplexed light signal. The system may also include a light focusing device, and the fiber optic element may be oriented to project light through the light focusing device. An additional element may be a diffraction grating having a diffraction order greater than one. The diffraction grating may be positioned in a Littrow configuration with respect to the light focusing device and may have a groove spacing equal to or larger than three times the wavelength of light used in the system.

11 Claims, 2 Drawing Sheets

OTHER PUBLICATIONS

U.S. Pending Patent Application Ser. No. 09/316,323: Davies, et al.; "Holographic Optical for Transmission of Optical Signals"; Radiant Research, Inc., May 21, 1999.

Richardson Grating Laboratory, "Technical Note 6, Echelle Gratings", <http://www.gratinglab.com/library/techNotes/technote6.asp>, Aug. 23, 1999.

M.C. Huntley, "Diffraction Gratings"; Academic Press, pp. 40–42, 1982.

Pending Patent Application: Tang et al.; "Compression–Molded Three Dimensional Tapered Optical Polymeric Waveguides for Optoelectronic Packaging"; Radiant Research, Inc.

Pending Patent Application: Tang et al.; "Reconfigurable Electro–Optic Interconnects Using Holographic Elements"; Radiant Research, Inc.

Pending Patent Application: Tang, et al.; "Compression–Molded Three–Dimensional Tapered Universal Waveguide Couplers"; Radiant Research, Inc.

Ciena, Fundamentals of DWDM: *pamphlet*.

* cited by examiner

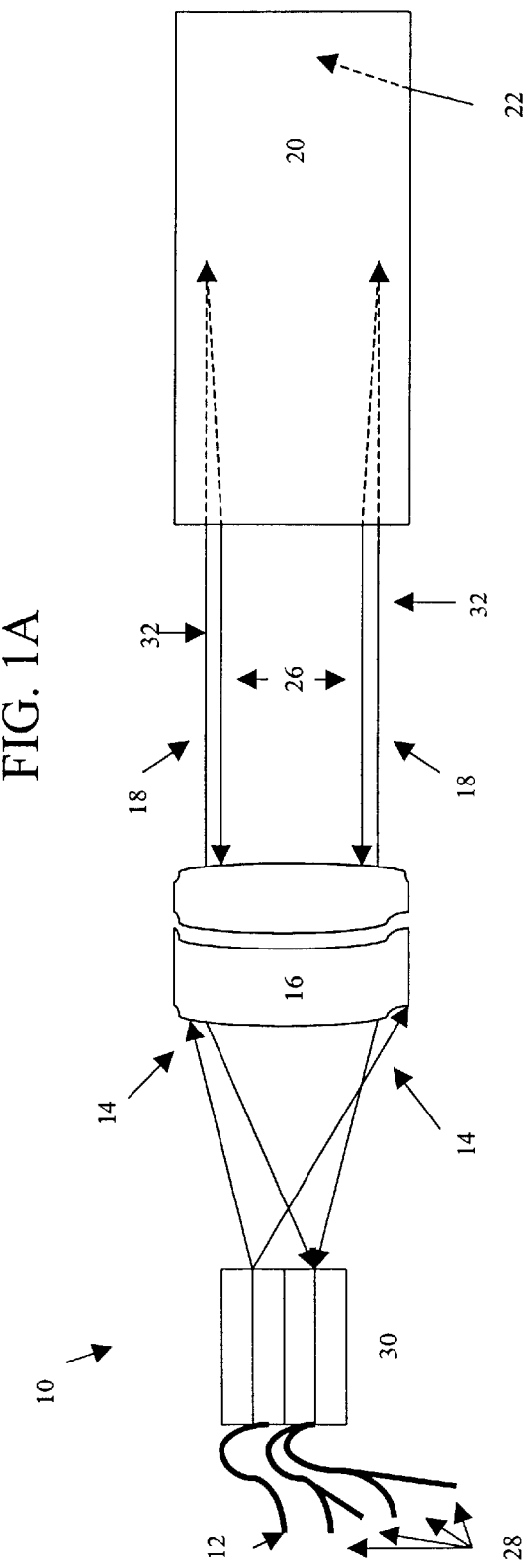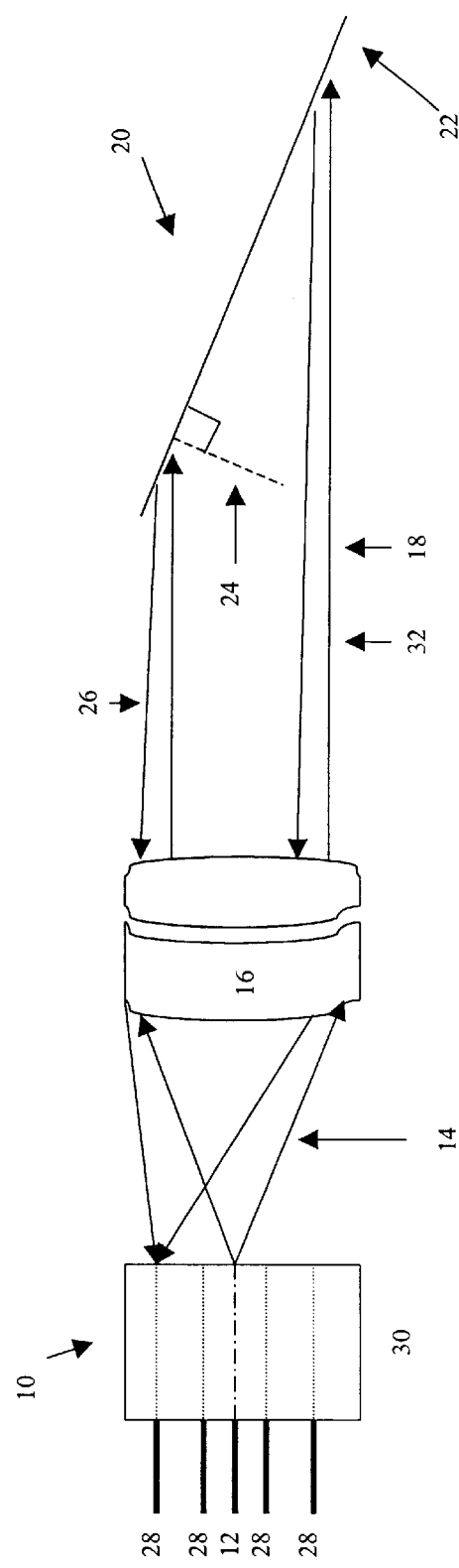

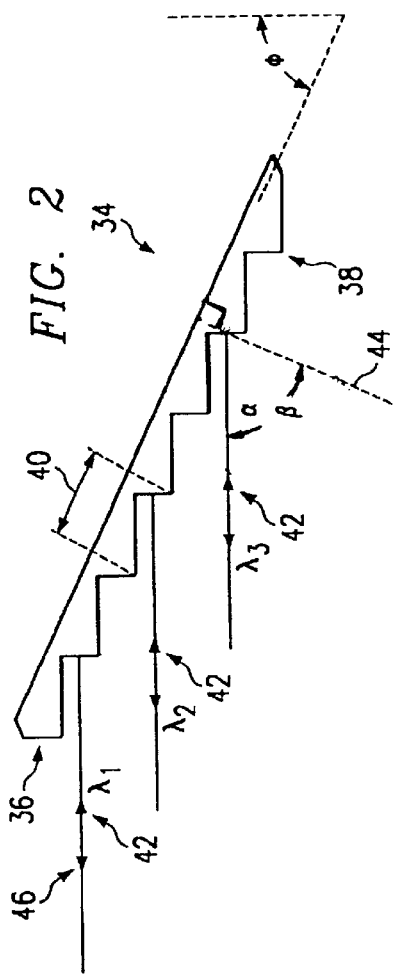
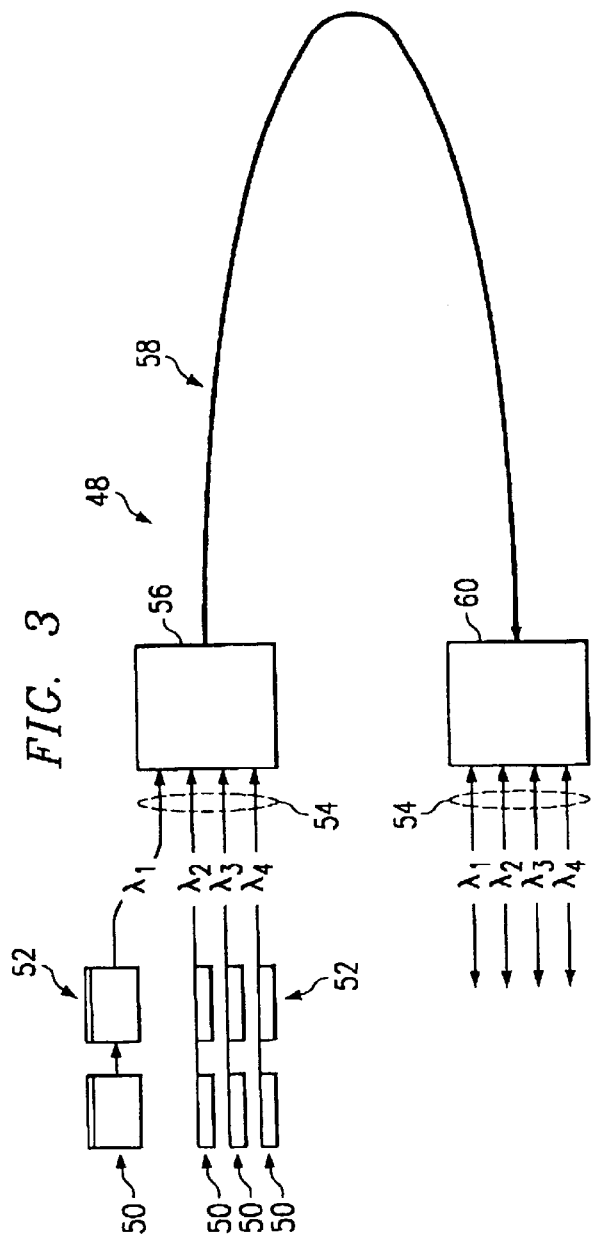

SYSTEM AND METHOD FOR WAVELENGTH DIVISION MULTIPLEXING AND DEMULTIPLEXING

GOVERNMENTAL RIGHTS

The invention was made with Government support under Contract No. F30602-98-C-0111 and F30602-00-C-0028 awarded by Air Force Research Laboratory, Information Directorate. The Government has certain rights in the invention.

TECHNICAL FIELD OF THE INVENTION

The present invention relates in general to fiber optic communication and, more particularly, to a system and method for wavelength division multiplexing and demultiplexing.

BACKGROUND OF THE INVENTION

As the information age has evolved and Internet usage has expanded, data transmission capacity has become increasingly important. At present, much of the data transmission load rests atop fiber optic networks. These fiber optic networks provide the backbone for many, if not most, networked data transmission systems.

Fiber optic networks use glass or plastic threads (i.e., fibers) to transmit data. A typical fiber optic cable consists of a bundle of these glass or plastic threads, each of which is capable of transmitting messages modulated onto light waves.

In recent years, the data transmission capacity of fiber optic cables has increased as a result of wavelength division multiplexing (WDM) and dense wavelength division multiplexing (DWDM). With WDM and DWDM systems, signals assigned to different wavelengths are combined into a single signal for transmission over a single line or medium.

In operation, a typical DWDM system may modulate each of several data streams onto a different part of the light spectrum. For example, one data stream may have an assigned wavelength of 1543 nanometers (nm) and the next data stream may have an assigned wavelength of 1543.8 nm. In most cases, the required spacing between assigned wavelengths is set by the International Telecommunication Union (ITU). Typical spacings include 0.4 nm and 0.8 nm.

The process of multiplexing has a counterpart, demultiplexing. Demultiplexing typically refers to the separation of a transmission coming through a single line or medium back into its constituent signals for further processing. Both multiplexing and demultiplexing are integral to the operation of a DWDM system.

The actual processes of multiplexing and demultiplexing within DWDM systems have conventionally involved very expensive and difficult to manufacture devices. Many, if not most, conventional DWDM devices are integrated optics devices that require a photolithography manufacturing step, which may account for a portion of the high cost associated with such devices.

Apart from being expensive to manufacture, conventional DWDM devices have operational shortcomings. For example, DWDM devices often have a high sensitivity to light polarization. Frequently referred to as polarization dependent loss (PDL), this high sensitivity to light polarization lessens the overall effectiveness and efficiency of conventional DWDM devices.

SUMMARY OF THE INVENTION

In accordance with teachings of the present invention, a system and method for wavelength division multiplexing and demultiplexing are disclosed that provide significant advantages over conventional approaches. The disclosed embodiments allow for relatively inexpensive multiplexing and demultiplexing devices that have negligible PDL.

According to one aspect of the present disclosure, a system for wavelength division multiplexing may include a fiber optic element operable to transmit a multiplexed light signal. The system may also include a light focusing device with the fiber optic element oriented to project light through the light focusing device. An additional element may be a diffraction grating having a diffraction order greater than one. The diffraction grating may be positioned in a Littrow configuration with respect to the light focusing (i.e., light striking the diffraction grating is sent back in the plane from which it arrived).

In some embodiments, the multiplexed light signal to be demultiplexed may include spectral components having assigned wavelengths. The assigned wavelengths may actually be an assigned range of wavelengths (e.g., 1543 +/−0.4 nm). Because PDL tends to become more problematic when the groove spacing, d, of a diffraction grating approaches and falls beneath three times the wavelength of light diffracting off the diffraction grating, embodiments of the present invention may include a diffraction grating with a groove spacing, d, greater than approximately three times the longest assigned wavelength ($\lambda$) of the multiplexed light. In some embodiments, the value of d/$\lambda$ may be larger than eight. In preferred embodiments, the value of d/$\lambda$ may be greater than twelve.

A preferred embodiment of a fiber optic system incorporating teachings of the present invention may also include a plurality of monochromatic fiber optic elements that are operable to carry monochromatic light. These fiber optic elements may be held in position by a multi-slotted mount or V-groove array.

According to another aspect of the present invention, a method for demultiplexing multiplexed light may include projecting multiplexed light toward a light focusing device. The multiplexed light may include spectral components, each having an assigned wavelength. The projected multiplexed light may be collimated by the light focusing device. The collimated light may then be diffracted with a diffraction grating that has a groove spacing, d, greater than three times the multiplexed light's longest assigned wavelength ($\lambda$). The diffraction grating may have a diffraction order greater than one and, in preferred embodiments, the diffraction order may be greater than fourteen.

When diffracting off of the diffraction grating, each light ray may have an approximately equal angle of incidence and angle of diffraction (i.e., be in autocollimation). Rays of different wavelengths (i.e., the spectral components), however, may diffract at slightly different angles and, as such, the diffraction grating may effectively separate the multiplexed light into its spectral components. Once diffracted, the spectral components may be focused with the same light focusing device and received with a respective receiving device (e.g., a signal detector or an optical fiber).

Technical advantages of the system and method include a relatively low manufacturing cost. Conventional system that require a photolithographic step in their manufacture often cost considerably more to manufacture than a system incorporating teachings of the present invention.

Other technical advantages include a decreased operational sensitivity to the polarization of incoming light and negligible PDL. Wavelength division multiplexing and demultiplexing systems that employ gratings often seek to operate within the scalar theory of gratings. The scalar theory begins to breakdown as a grating's groove spacing decreases. This breakdown manifests itself as an increased sensitivity to light polarization.

Because conventional systems employ first order diffraction gratings that have a relatively small groove spacing, many, if not all, of these systems either have high PDL's or employ expensive equipment and/or techniques to counteract the PDL problems. The disclosed system tends to avoid these problems by using diffraction orders greater than one and groove spacings larger than three times the wavelength of the diffracted light.

Other technical advantages will be apparent to those of ordinary skill in the art in view of the following specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1A depicts a top view of a wavelength division demultiplexer incorporating teachings of the present invention;

FIG. 1B depicts perspective view of the wavelength division demultiplexer depicted in FIG. 1A;

FIG. 2 is a schematic drawing showing an enlarged sectional view with portions broken away of a blazed grating that may be used in wavelength division multiplexers or demultiplexers that incorporate teachings of the present invention; and FIG. 3 provides a schematic drawing showing a representative view with portions broken away of a fiber optic system incorporating teachings of the present invention.

DETAILED DESCRIPTION OF THE INVENTION

Preferred embodiments and their advantages are best understood by reference to FIGS. 1A through 3, wherein like numbers are used to indicate like and corresponding parts.

FIG. 1A depicts a top view of a wavelength division demultiplexer 10 incorporating teachings of the present disclosure. During operation of demultiplexer 10, a fiber optic element 12 may project a multiplexed light signal 14 through a light focusing device 16. As depicted in FIG. 1A, multiplexed light signal 14 may be a combination of four spectral components 18 (i.e., multiplexed light signal 14 is made up of light falling within one of four distinct wavelength ranges). Other embodiments may include more or less spectral components. For example, in a preferred embodiment, a multiplexed light signal may include thirty-two spectral components ranging from 1540 to 1570 nm. The spacing between these spectral components may be 0.8 nm though other spacings are possible (e.g., 0.4).

Light focusing device 16 may include, as depicted in FIG. 1A, multiple lenses. In other embodiments, light focusing device 16 may include a single biconvex lens or any other device operable to collimate diverging light or focus collimated light.

Once collimated, multiplexed light signal 14 and its spectral components 18 or light rays of the same may project toward diffraction grating 20, which may have a blazed surface 22. As depicted in FIG. 1A, blazed surface 22 is on the under side of diffraction grating 20. In some embodiments, diffraction grating 20 may be positioned in a Littrow configuration. For example, diffraction grating 20 may be positioned in an over and under Littrow configuration, which may be seen more clearly in FIG. 1B.

Diffraction grating 20 may also define a grating normal 24 (shown in FIG. 1B). From grating normal 24, an angle of incidence and an angle of diffraction may be measured for spectral components 18 as they strike and diffract from blazed surface 22 of diffraction grating 20. In preferred embodiments, the angle of incidence and the angle of diffraction for each of the spectral components 18 will be equal or approximately equal.

After diffracting from diffraction grating 20, rays 26 may be focused at respective monochromatic fiber optic elements 28. The focusing device may be light focusing device 16. In preferred embodiments, monochromatic fiber optic elements 28 will be fixed in position by a multislotted mount 30. Individual slots of mount 30 may be formed from opposing V-grooves and may be operable to securely position one monochromatic fiber optic element in a selected position. Preferably, the positioning of monochromatic fiber optic elements 28 will allow each monochromatic fiber to accept rays in a distinct range of wavelengths from light focusing device 16 and diffraction grating 20.

FIG. 1B depicts a perspective view of the wavelength division demultiplexer depicted in FIG. 1A. As depicted in FIG. 1B, wavelength division demultiplexer 10 includes fiber optic element 12 projecting multiplexed light through light focusing device 16. Light focusing device 16 collimates multiplexed light 14, which projects toward diffraction grating 20 and, more particularly, toward blazed surface 22 of diffraction grating 20.

In the embodiment depicted in FIG. 1B, diffraction grating 20 is positioned in an over and under Littrow configuration. As such, rays 26, in the embodiment of FIG. 1B, diffract from diffraction grating 20, under incident rays 32, through light focusing device 16, and toward monochromatic fiber optic elements 28. Again, in preferred embodiments, monochromatic fiber optic elements 28 may be fixed in position by mount 30.

Though FIGS. 1A and 1B depict light entering a wavelength division demultiplexer 10 through fiber optic element 12 and leaving through monochromatic fiber optic elements 28, roles may be reversed in a wavelength division multiplexer (i.e., light may enter as spectral components 18 via monochromatic fiber optic elements 28 and leave as a multiplexed light signal 14 via fiber optic element 12).

FIG. 2 shows an enlarged sectional view of a blazed diffraction grating 34, which may be used in wavelength division multiplexers or demultiplexers that incorporate teachings of the present invention. Blazed diffraction grating 34 may have a blazed surface 36. Blazed diffraction grating 34 may be made from any number of materials. For example, blazed diffraction grating 34 may be made of glass and have an aluminum blazed surface. In some embodiments, the blazed surface may have a silicon monoxide (SiO) coating. A preferred blazed diffraction grating is supplied by Richardson Grating Laboratory of Rochester, as part number 1319LE-415.

As depicted in FIG. 2, blazed surface 36 may have peaks 38 spaced a uniform distance 40 from one another. Distance 40 may be used to define the groove density of diffraction grating 34. Typically, groove density, G, is defined by the equation $G=1/d$, where $d=$ the distance indicated by Distance 40 (i.e., groove spacing). Groove density often has a large impact on the efficiency and the polar sensitivity of a grating.

As groove density increases and the spacing between grooves narrows to three times or less the wavelength of the light being diffracted, PDL begins to occur and efficiencies decrease. This is a common problem facing conventional wave division multiplexing and demultiplexing devices.

As shown in FIG. 2, diffraction grating 34 may also define a grating normal 44. Grating normal 44 may provide a reference axis for calculating an angle of incidence and an angle of diffraction for incident rays 42 and diffracted rays 46. When blazed surface 38 receives incident rays 42, which may be of differing wavelengths (e.g., $\lambda_1$ through $\lambda_3$), these rays may be diffracted (i.e., bounced off blazed surface 38). The angle between grating normal 44 and incident rays 42 may be measured to define an angle of incidence, $\alpha$. Similarly, the angle between grating normal 44 and diffracted rays 46 may be measured to define an angle of diffraction, $\beta$.

In the embodiment depicted in FIG. 2, $\alpha$ and $\beta$ approximate one another. In addition, $\alpha$ and $\beta$ approximate a mounting angle, $\phi$, which represents the angle between grating normal 44 and the optical axis of a multiplexing or demultiplexing system (e.g., the system depicted in FIGS. 1A and 1B). In the system of FIGS. 1A and 1B, the optical axis may be defined by light focusing device 16. In one embodiment, $\alpha$, $\beta$, and $\phi$ may all be greater than fifty degrees. These large angles cause high dispersion, which in turn causes the overall system size to be small. In a preferred embodiment, $\alpha$, $\beta$, and $\phi$ may all fall between approximately sixty-two and sixty-six degrees.

Diffraction grating 34 may also have a diffraction order. This diffraction order, m, may be defined by the grating equation:

$$\frac{m\lambda}{d} = \sin \alpha + \sin \beta$$

where, $m$ = diffraction order $\lambda$ = the wavelength of light diffracted (e.g., 1550 nm)

$1/d$ = groove density ($G$)

$\alpha$ = angle of incidence $\beta$ = angle of diffraction

As depicted in FIG. 2, diffraction grating 34 has a diffraction order greater than one. In preferred embodiments, diffraction grating 34 may have a diffraction order greater than fourteen (e.g., 22). At diffraction orders near fourteen and higher, PDL may decrease and efficiencies may improve. This may happen because higher diffraction orders (e.g., 14 and larger) allow for an increase in groove spacing and a resulting decrease in groove density.

For example, when solving for groove spacing, d, with a diffraction order of twenty-two, a wavelength of 1550 nm, and $\alpha \approx \beta \approx 64.1$ degrees, the grating equation yields a groove spacing approximately equal to ⅕₀th of a millimeter (0.019 $\mu$m). This groove spacing results in negligible PDL and high efficiencies, because it is approximately twelve times the wavelength.

FIG. 3 shows a representative view of a fiber optic system 48 incorporating teachings of the present disclosure. In operation, power supplies 50 may be operable to power and modulate tuned lasers 52. Tuned lasers 52 may be tuned to project a beam of light at a specified assigned wavelength (e.g., $\lambda_1$, which may equal 1543 nm). As depicted, fiber optic system 48 includes four power supplies and four tuned lasers generating light in four distinct wavelength ranges. In other embodiments, a fiber optic system may include a different number of power supplies, lasers, and wavelengths (e.g., thirty-two).

The four distinct wavelength ranges 54 (i.e., spectral components) may enter a wavelength division multiplexer 56 that incorporates teachings of the present disclosure. Once inside, wavelength ranges 54 may be projected toward a diffraction grating having a diffraction order greater than one (e.g., diffraction grating 34 of FIG. 2). The diffraction grating may diffract each of the wavelength ranges 54, in accordance with the grating equation, toward a light focusing device (e.g., light focusing device 16 of FIGS. 1A and 1B). The light focusing device may focus wavelength ranges 54 into a multiplexed signal as wavelength ranges 54 pass through the light focusing device. At that point, a fiber optic element operable to transmit a multiplexed signal (e.g., fiber optic element 12 of FIGS. 1A and 1B) may receive the multiplexed signal and carry it into a fiber optic cable 58, which may carry it to a wavelength division demultiplexer 60.

Wavelength division demultiplexer 60 may incorporate teachings of the present disclosure. For example, multiplexed light may enter demultiplexer 60 via a fiber optic element operable to transmit a multiplexed signal (e.g., fiber optic element 12 of FIGS. 1A and 1B). The multiplexed light may be projected through a light focusing device that collimates the multiplexed light. The collimated light may then project toward a diffraction grating having a diffraction order greater than one (e.g., diffraction grating 34 of FIG. 2), and each of the spectral components may diffract at slightly different angles, effectively separating the multiplexed light into its spectral components.

The rays diffracted by the diffraction grating may then project back through the light focusing device which may focus the diffracted light. However, instead of being focused back into a single beam of multiplexed light, each of the spectral components of the diffracted light may be focused to slightly different locations. This altered focusing results from the spectral components diffracting from the diffraction grating at slightly different angles. These angles may be calculated with the above referenced grating equation. At the different focus locations, there may be respective receiving devices designed to receive a specific wavelength range of light (e.g., a specific spectral component). The respective receiving devices may be sensors operable to identify light signals (e.g., pulses of light) and convert the signals into data. In other embodiments, the respective receiving devices may be individual fibers that are similar to monochromatic fiber optic elements 28 of FIGS. 1A and 1B. These fibers may pass the separated spectral components along as demultiplexed light signals.

Although the disclosed embodiments have been described in detail, it should be understood that various changes, substitutions and alterations can be made to the embodiments without departing from their spirit and scope.

What is claimed is:

1. A fiber optic system, comprising:

a light focusing device;

an optical axis defined in part by the light focusing device;

a fiber optic element operable to transmit a multiplexed light signal, the fiber optic element oriented to project light through the light focusing device;

a diffraction grating having a diffraction order greater than one, the diffraction grating positioned in a Littrow configuration with respect to the light focusing device and the fiber optic element;

the diffraction grating having a grating normal for calculating an angle of incidence and an angle of diffraction;

a mounting angle defined as the angle between the grating normal and the optical axis;

the diffraction grating oriented such that light approaching the diffraction grating generally along the optical axis and diffracting from the diffraction grating generally along the optical axis produces angles of incidence and diffraction which are approximately equal with each other and the mounting angle; and the angle of incidence, the angle of diffraction and the mounting angle greater than fifty eight degrees when measured from the grating normal.

2. The system of claim 1, wherein the light focusing device comprises a lens.

3. The system of claim 1, further comprising a plurality of monochromatic fiber optic elements, each operable to carry monochromatic light, the plurality of monochromatic fiber optic elements positioned to be operable to accept different wavelength ranges of diffracted light.

4. The system of claim 1, wherein the diffraction grating comprises a groove spacing equal to or greater than three times a longest assigned wavelength for the system.

5. The system of claim 1, wherein the plurality of monochromatic fibers comprises thirty-two single mode fibers.

6. The system of claim 1, wherein the diffraction grating comprises a diffraction order greater than fourteen.

7. The system of claim 1, wherein the diffraction grating comprises a diffraction order greater than fourteen and a groove spacing greater than eight times a longest assigned wavelength for the system.

8. A method for combining spectral components into a multiplexed signal, comprising:

projecting a plurality of spectral components with assigned wavelengths toward a diffraction grating with each spectral component having an angle of incidence and an angle of diffraction in a range between sixty degrees and sixty six degrees and the diffraction grating having a groove spacing greater than three times a longest assigned wavelength;

diffracting each of the plurality of spectral components toward a light focusing device;

focusing the plurality of spectral components into a multiplexed signal with the light focusing device; and receiving the multiplexed signal with a receiving device that comprises a fiber optic element operable to transmit the multiplexed signal.

9. The method of claim 8, wherein the light focusing device comprises a lens.

10. A fiber optic system comprising:

a light focusing device;

a fiber optic element operable to project a multiplexed light signal through the light focusing device;

a plurality of fiber optic elements disposed at respective positions in a multislotted mount;

each fiber optic element in the mount operable to receive a distinct range of wavelengths from the light focusing device;

a diffraction grating including a blazed surface centered about 1550 nanometers;

the diffraction grating having a diffraction order defined by a grating equation;

the light focusing device and the diffraction grating cooperating with each other to produce angles of incidence and diffraction greater than fifty eight degrees;

the diffraction grating having a diffraction order of greater than fourteen; and the position of each optical fiber element in the mount based on the grating equation.

11. The system of claim 10 wherein the mount for the fiber optic elements further comprises respective v-grooves for holding each fiber optic element spaced from the other fiber optic elements at a distance operably associated with one of the diffraction orders of the diffraction grating.

\* \* \* \* \*